(12) United States Patent
Ma et al.

(10) Patent No.: US 8,089,731 B1
(45) Date of Patent: Jan. 3, 2012

(54) BEND-DOWN TAB FOR OUTRIGGER LEAD SUPPORT IN A DISK DRIVE SUSPENSION

(75) Inventors: Li Jun Ma, DongGuan (CN); Fei He, DongGuan (CN)

(73) Assignee: Magnecomp Corporation, Murrieta, CA (US)

( * ) Notice: Subject to any disclaimer, the term of this patent is extended or adjusted under 35 U.S.C. 154(b) by 967 days.

(21) Appl. No.: 12/041,051

(22) Filed: Mar. 3, 2008

(51) Int. Cl.
*G11B 5/48* (2006.01)

(52) U.S. Cl. .................. 360/245.3; 360/245; 360/245.2; 360/245.7

(58) Field of Classification Search .................. 360/245, 360/245.2, 245.3, 245.7
See application file for complete search history.

(56) References Cited

U.S. PATENT DOCUMENTS

| | | | |
|---|---|---|---|
| 5,434,731 A | 7/1995 | Hagen | |
| 5,923,500 A | 7/1999 | Hagen | |
| 5,956,209 A * | 9/1999 | Shum | 360/244.3 |
| 6,046,883 A * | 4/2000 | Miller | 360/245.7 |
| 6,055,132 A | 4/2000 | Arya et al. | |
| 6,266,212 B1 | 7/2001 | Coon | |
| 6,388,843 B1 * | 5/2002 | Takagi et al. | 360/245.7 |
| 6,515,832 B1 | 2/2003 | Girard | |
| 6,539,609 B2 | 4/2003 | Palmer et al. | |
| 6,587,309 B2 * | 7/2003 | Nojima | 360/245.7 |
| 6,788,498 B1 | 9/2004 | Bjorstrom et al. | |
| 7,021,097 B1 | 4/2006 | Ubl et al. | |
| 7,068,471 B1 | 6/2006 | Bjorstrom et al. | |
| 7,152,303 B2 | 12/2006 | Childers et al. | |
| 2007/0297094 A1 | 12/2007 | Sassine | |

* cited by examiner

*Primary Examiner* — Daniell L Negron
*Assistant Examiner* — Carlos E Garcia
(74) *Attorney, Agent, or Firm* — Intellectual Property Law Offices of Joel Voelzke, APC

(57) ABSTRACT

A disk drive suspension with a bend-down tab which supports an outrigger lead. The bend-down tab extends laterally to the suspension and away from the slider, and can include tabs which are narrower than the electrical lead. The depth of the tab can be at least the depth of the outrigger lead, or deeper. The tab can be supported by and integrally formed with an elongate gimbal spring arm.

20 Claims, 5 Drawing Sheets

| Outrigger Offset (micron) | pitch (uNm/deg) | roll (uNm/deg) | lateral (N/mm) | vertical (N/mm) |
|---|---|---|---|---|
| 0 | 0.637 | 0.434 | 4.158 | 38.993 |
| 4 | 0.584 | 0.432 | 4.205 | 38.055 |
| 8 | 0.536 | 0.429 | 4.226 | 37.058 |
| 12 | 0.495 | 0.426 | 4.220 | 36.050 |
| 16 | 0.462 | 0.424 | 4.189 | 35.079 |
| 18 | 0.447 | 0.422 | 4.167 | 34.621 |
| 20 | 0.435 | 0.421 | 4.141 | 34.186 |
| 22 | 0.425 | 0.420 | 4.111 | 33.777 |
| 24 | 0.416 | 0.419 | 4.079 | 33.398 |
| 26 | 0.409 | 0.417 | 4.045 | 33.049 |
| 28 | 0.403 | 0.416 | 4.009 | 32.731 |
| 32 | 0.397 | 0.414 | 3.935 | 32.190 |
| 40 | 0.399 | 0.411 | 3.782 | 31.479 |
| 44 | 0.406 | 0.409 | 3.707 | 31.293 |
| 44 | 0.422 | 0.408 | 3.505 | 31.184 |

FIG. 8

BEND-DOWN TAB FOR OUTRIGGER LEAD SUPPORT IN A DISK DRIVE SUSPENSION

CROSS-REFERENCE TO RELATED APPLICATIONS

Not Applicable

BACKGROUND OF THE INVENTION

1. Field of the Invention

This invention relates to the field of disk drives, in particular to disk drive suspensions.

2. Description of Related Art

A disk drive generally uses one or more spinning storage disks, sometimes called storage media, to store data. Disks can be rigid, as used in hard drives, or flexible, as used in floppy drives. Disks commonly store data using magnetic methods or optical methods, and can spin at rates exceeding 15,000 revolutions per minute (rpm). Hard disk drives generally employ several rigid disks stacked one on top of another with spaces in between, attached to a common spindle. Floppy disk drives generally employ a single flexible disk in a bonded sleeve.

A disk, whether magnetic or optical, normally stores data in tracks which run in a spiral fashion around the disk. Because tracks are narrow and closely spaced in proportion to the diameter of a disk, the tracks approximately run tangentially around the disk. The term "tangentially" refers to directions which are in a plane parallel to the disk and at right angles to the disk's radial directions.

Over the surface of each disk in a disk drive, commonly on both sides of each disk, a read-write head is suspended in close proximity to the disk surface by a disk drive suspension. A disk drive suspension is sometimes referred to as a disk drive head suspension or simply a suspension. In hard disk drives with multiple disks on a spindle, suspensions operate in the spaces between the disks and on the two outer disk surfaces. A suspension is a cantilever beam-like feature, mounted on a movable actuator arm. The suspension extends to a precise but variable location above a disk. A suspension typically includes a mounting region, a hinge, load beam, gimbal, and flexure.

The combination of a suspension as discussed above, a read-write head, and a base plate which mounts the suspension to an actuator arm is sometimes called a suspension assembly or a head suspension assembly (HSA). A base plate is sometimes called a mount plate, mounting plate, or clad arm.

The load beam is a major arm-like part of the suspension which forms part of its structural backbone. An actuator arm supports the load beam at the load beam's proximal end, and the load beam supports the flexure at the load beams' distal end. The term "load beam" refers to a structure which may be unitary or may be composed of separately formed parts which are later affixed to one another.

The gimbal is held by the load beam over the disk. The gimbal retains the read-write head in a precise position near the load beam distal end while allowing the read-write head to pitch and roll slightly. A gimbal can be an integrally formed portion of a load beam, or it can be a separately formed part.

The flexure is typically referred to as a wiring layer or a circuit or one of several branded terms, i.e. Integrated Lead Suspension (ILS), Flex On Suspension (FOS), Integrated Lead Flexure (ILF), Electrical Lead Suspension (ELS), or Additive Circuit Gimbal (AGG). The flexure electrically connects the read-write head, located at the distal end of the suspension, to disk drive circuits at the proximal end of the head suspension. An electrical interconnect, sometimes referred to as "electrical leads," is supported by the flexure and is often integrally formed with the flexure. The electrical interconnect carries electrical signals from the read-write head that are read from the disk across the suspension to disk drive circuitry. The flexure also carries electrical signals to be written to the disk from the disk drive circuitry across the suspension to the read-write head. The flexure can be integrally formed on a load beam.

The read-write head, also referred to as a head or a "slider," contains the read-write transducer circuitry upon its proximal end. The slider surface facing the disk is designed and reactive-ion etched to define an aerodynamic pattern typically comprising rails that, in conjunction with the spinning disk, generate a positive pressure thereby lifting the slider from the spinning disk surface. The wind of the rapidly spinning disk running past aerodynamic pattern of protrusions on the slider creates the air bearing surface (ABS) that enables the slider to fly at a constant height close to the disk during operation of the disk drive. The resultant boundary layer of air is commonly called an air bearing. The gram force of the load beam hinge pushes the slider toward the disk while the air bearing of the disk pushes away until an equilibrium position is reached. The equilibrium position is designed to be close enough to the disk so that the slider's read-write circuitry can interact with the disk but far enough away to prevent mechanical contact.

The suspension positions a read-write head over the middle of a single track during a single read or write operation. If the read-write head deviates left or right of a track then data may not be read or written correctly. This problem is sometimes called track misregistration (TMR). Therefore, it is important for the suspension to keep the slider positioned centrally over a track, and a laterally stiff suspension is thus preferred.

It is also preferable for a suspension's gimbal to pitch and roll freely, especially for smaller dimensioned sliders. Free pitch and roll movement requires low pitch and roll stiffness of the gimbal itself as well as the electrical interconnect which connects to the slider on the gimbal.

An "outrigger" is a longitudinal section of a suspension which is substantially separate from and extends beyond the side of the body of the suspension. An outrigger can include, among other things, an elongate gimbal spring arm, a flexure arm, or a section of electrical interconnect. Commonly, an outrigger refers to sections which are lateral to the gimbal or flexure tongue. An elongate gimbal spring arm is sometimes referred to as a stainless steel (SST) outrigger. A section of flexure or electrical interconnect configured as an outrigger is sometimes referred to as an "outrigger lead." There can exist multiple outriggers on one side of a suspension which are displaced laterally one outside the other. An outrigger which is inboard of a second outrigger is sometimes referred to as an "inrigger."

In the prior art, design techniques to reduce pitch and roll stiffness included reducing outrigger width or increasing outrigger length. However, these traditional methods are geometry-limited.

SUMMARY OF THE INVENTION

The present invention is a disk drive suspension having a "bend-down tab" which supports an outrigger, such as an outrigger lead. The tab "bends down," away from the side of the suspension upon which the slider is mounted. The tab can have a shoulder, a leg, and a foot. The shoulder juts out from the suspension, the leg extends downward (i.e., away from the slider mounting side) off the shoulder, and the foot extends out from the leg. The leg carries the outrigger. The bend-down tab supports the outrigger at a lower height than a conventional flat tab. The bend-down tab preferably supports the outrigger so that the top of the outrigger is lower than the bottom of the rest of the suspension. The present invention also includes an entire disk drive incorporating the disk drive suspension.

In a first aspect, therefore, the invention is a disk drive suspension with a body and an outrigger lead, where the suspension has means for supporting the outrigger lead laterally beyond the body of the suspension and in a plane that is substantially parallel to the plane of the suspension and vertically offset, such that the offset reduces suspension pitch stiffness contributed by the outrigger lead.

In a second aspect, the invention is a disk drive suspension with a body having a slider mounting side, a tab supported by the body, and an outrigger, in which the tab has a leg extending away from the slider mounting side and a foot extending laterally from the leg, the foot supporting the outrigger.

In a third aspect, the invention is a disk drive suspension with a load beam, a gimbal spring arm, a bend-down tab, and an electrical lead in which the load beam supports the gimbal spring arm, and the bend-down tab is connected to the gimbal spring arm, extending outwardly and laterally from the gimbal spring arm and away from the suspension's slider mounting side, and supports the electrical lead.

Exemplary embodiments of the invention will be further described below with reference to the drawings, in which like numbers refer to like parts.

BRIEF DESCRIPTION OF THE DRAWINGS

FIG. 8 is a table of roll, pitch, lateral, and vertical stiffness data for various outrigger offsets collected from finite element analyses of suspensions according to embodiments of the present invention.

DETAILED DESCRIPTION OF THE PREFERRED EMBODIMENTS

Figure 1:
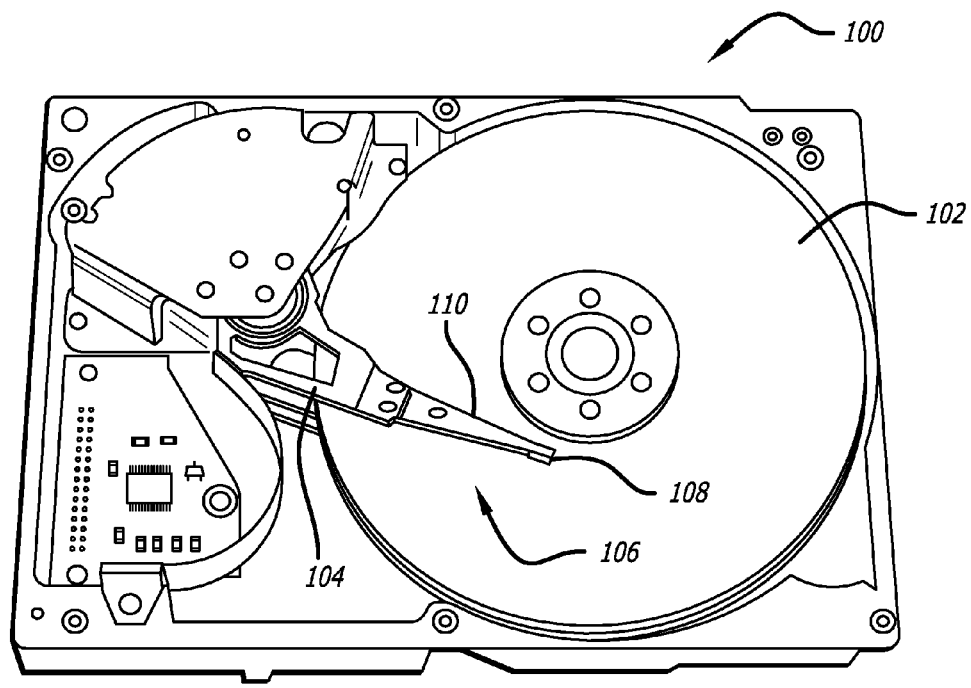
FIG. 1 is a perspective view of a hard disk drive according to an embodiment of the present invention.

With reference to FIG. 1, a typical hard disk drive 100 includes at least one data storage disk 102 (e.g., one, two, three, or more disks), at least one actuator arm 104 (e.g., one, two, three, or more actuator arms), and at least one head suspension assembly (HSA) 106 (e.g., one, two, three, or more head suspension assemblies). Each HSA 106 is composed of a slider 108 and a suspension 110. This diagram, as well as other diagrams provided herein, is merely an example, which should not unduly limit the scope of the claims herein. One of ordinary skill in the art would recognize many other variations, modifications, and alternatives.

Figure 2:
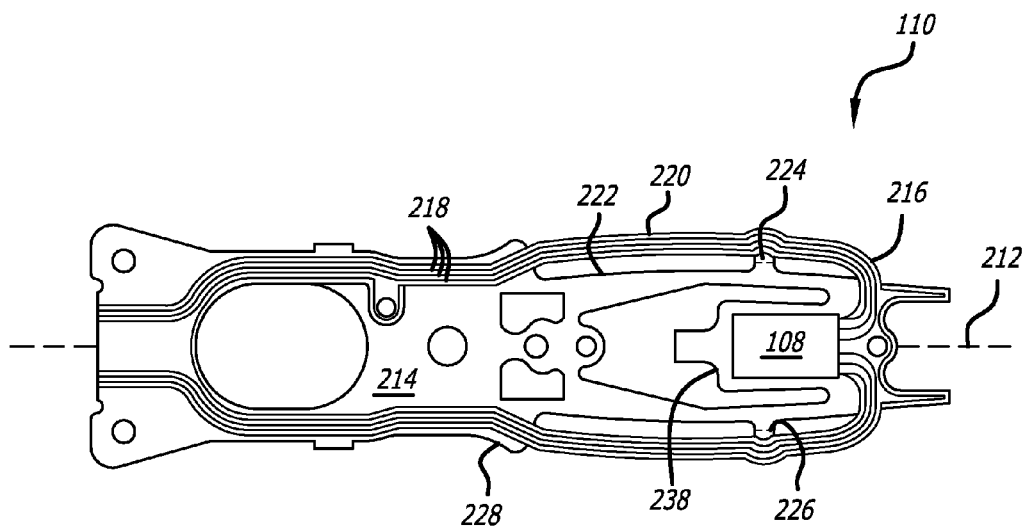
FIG. 2 is a plan view of a suspension according to an embodiment of the present invention.

With reference to FIG. 2, suspension 110 has a top side, which is shown, upon which slider 108 can be mounted on a slider mount area (not shown). Suspension 110 also has bottom side (not shown) opposite the slider mount area. Suspension 110 has a longitudinal axis 212. Suspension 110 also includes load beam 214 and flexure 216 upon which electrical leads 218 can be formed.

Suspension 110 has an outrigger 220, which extends beyond the side of flexure tongue 238. In the exemplary embodiment, outrigger 220 is a portion of electrical leads 218. Suspension 110 can also have an inrigger 222. In the exemplary embodiment, inrigger 222 is an elongate gimbal spring arm. The majority of suspension 110 is the suspension body 228 which is relatively planar. Suspension body 228 includes inrigger 222 and flexure tongue 238.

To support outrigger 220, suspension 110 has a tab 224. A tab can be referred to as a bracket, support bracket, a support, a hook, or a strut. Tab 224 can be integrally formed with suspension 110, or it can be separately formed then attached, such as by welding, to suspension 110. Tab 224 extends outwardly and laterally from inrigger 222, and supports outrigger 220 at tab 224. Also shown is a second tab 226, which is laterally opposite, or on the other side of longitudinal axis 212 from, first tab 224. Outrigger 220 is tethered to inrigger 222 by tab 224, typically by chemically bonding outrigger 220 to tab 224.

Figure 3:
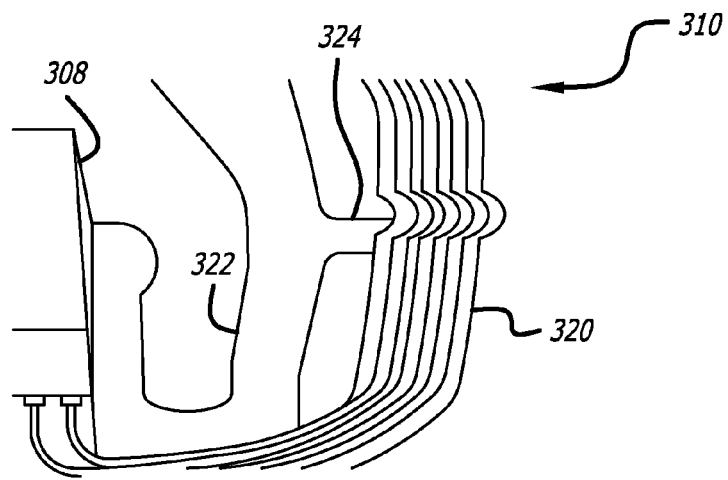
FIG. 3 is a perspective view of a prior art tab.

FIG. 3 shows a perspective view of a part of a suspension of the prior art. The view is of the top, slider mounting side of a suspension 310 looking at a tilt from the distal to the proximal end of suspension. Suspension 310 is shown with slider 308, inrigger 322, and outrigger 320. Inrigger 322 is an elongate gimbal spring arm, and outrigger 320 is a portion of an electrical lead.

Tab 324 extends outwardly and laterally from inrigger 322 and supports outrigger 320. Prior art tab 324 is flat, meaning that it does not substantially extend out of the plane of inrigger 322, or the local plane of the suspension from which it protrudes.

Figure 4:
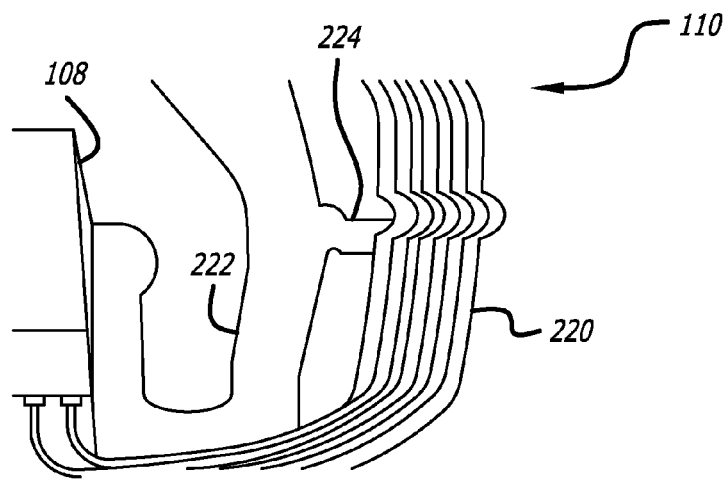
FIG. 4 is a perspective view of a tab according to an embodiment of the present invention.

FIG. 4 shows a similar perspective view of a suspension; however, the suspension is one with a tab according to an embodiment of the present invention. Suspension 110 is shown with slider 108, inrigger 222, and outrigger 220. Inrigger 222 is an elongate gimbal spring arm, and outrigger 220 is a portion of an electrical lead.

Tab 224 extends outwardly and laterally from inrigger 222 and supports outrigger 220. Tab 224 is bent down, or away from the slider mounting side of suspension 110. For this reason, tab 224 can be called a "bend-down tab." In contrast to the flat tab of FIG. 3, bend-down tab 224 extends substantially out of the plane of inrigger 222 and out of the plane of suspension 110. In the exemplary embodiment, tab 224 also bends back into a plane which is substantially parallel to that of inrigger 222. Although it is not necessary for the tab to bend back, this feature helps minimize outrigger cross-sectional area presented to the wind. Bend-down tab 224 holds the bottom of outrigger 220 lower than the bottom of inrigger 222. Bend-down tab 224 can bend so far down that the top of outrigger 220 in the area near tab 224 can be lower than the bottom of inrigger 222.

In the exemplary embodiment, outrigger 220 bows from its proximal end (not shown) which is supported by the suspension body, downward (i.e., away from the slider side) to bend-down tab 224, and then back up to the distal portion of the flexure which has interconnection pads to slider 108.

Figure 6:
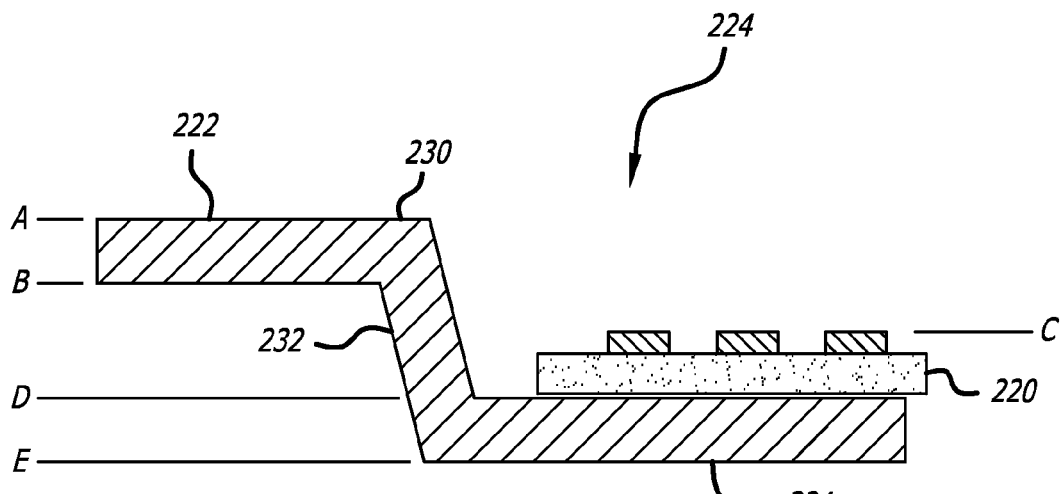
FIG. 6 is a sectional view of the tab in FIG. 5, taken along section line 6-6.

A "tab depth" refers to the vertical distance between the top of the shoulder 230 of tab 224 and the top of the foot 234 of tab 224 (FIG. 6). A tab depth of at least 20 microns has been found to produce good results according to simulations.

An "outrigger offset" refers to the vertical distance between the top of outrigger 220 at tab 224 and the bottom of inrigger 222. Outrigger offsets of at least 20 microns and at least 32 microns have been shown to produce good results according to a simulation.

Figure 5:
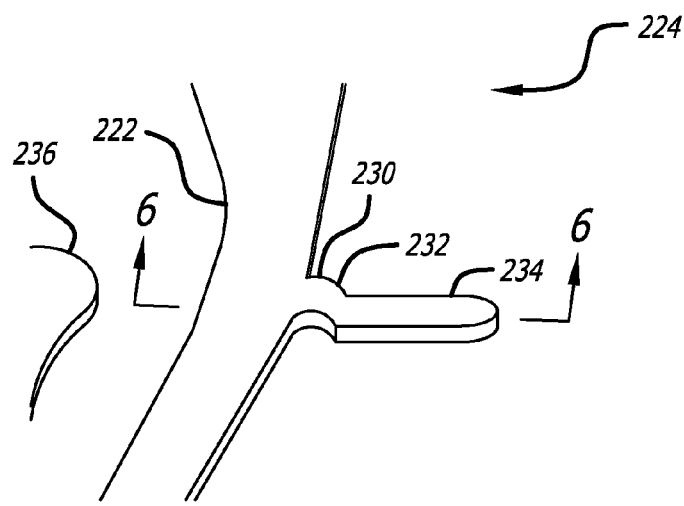
FIG. 5 is an unobscured perspective view of the tab in FIG. 4.
Figure 7:
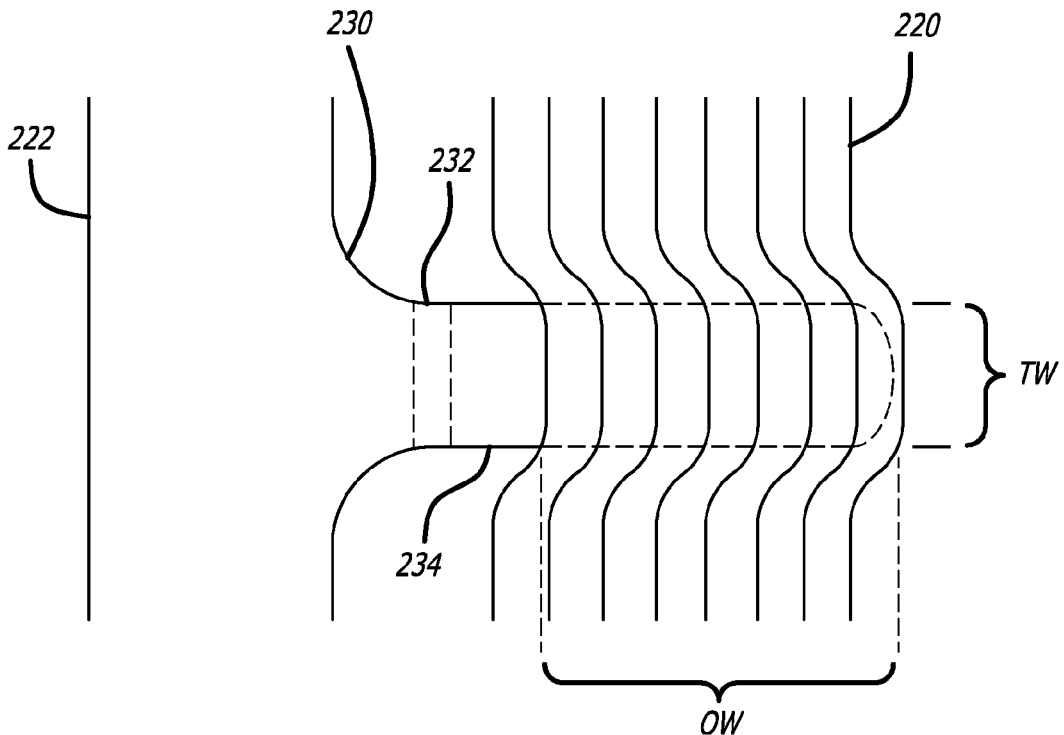
FIG. 7 is a plan view of a tab according to an embodiment of the present invention.

With reference to FIGS. 5, 6, and 7, bend-down tab 224 can have a shoulder 230, leg 232, and foot 234. Shoulder 230 juts out at the same height as the portion of the suspension from which it extends. In the exemplary embodiment, shoulder 230 extends from inrigger 222. Shoulder 230 is optional; its presence helps to relieve residual stress in the metal bend due to fabrication. Leg 232 extends down, or away from the slider mounting side of suspension 110. Slider mounting portion 236 of suspension 110 is partly shown in FIG. 5. Leg 232 can be supported by shoulder 230 if shoulder 230 is present. Foot 234 extends laterally from leg 232. In the exemplary embodiment, leg 232 extends outwardly and laterally from suspension 110 into a plane which is parallel to the plane of inrigger 222. The width of tab 224 is the lateral width of tab 224 on the widest point of foot 234. With reference to FIG. 7, the width of the tab is TW. The width of an outrigger at the tab is the lateral width of the outrigger at the tab. The width of outrigger 220 at the tab is OW.

With reference to FIG. 6 only, vertical height can be represented by horizontal lines A, B, and so on in the figure. The depth of tab 224 (i.e., tab depth) is the vertical distance between the top of shoulder 230 and the top of foot 234, which is the vertical distance between lines A and D. A tab depth of exactly the depth of the electrical lead places the top of the electrical lead even with the top of the suspension body. This and greater tab depths have been found to be useful. Offset height is the vertical distance between the bottom of shoulder 230 and the top of outrigger 220, which is the vertical distance between lines B and C. If shoulder 230 is not present, then the top and bottom of the structure from which leg 232 protrudes down can be used as reference surfaces. The depth of outrigger 220 is the vertical distance between the top of outrigger 220 and the bottom of outrigger 220. For an outrigger lead or an electrical lead, the outrigger depth is from the top of the highest electrical conductor to the bottom of the support layer, which is the vertical distance between lines C and D in the figure. For an outrigger lead, a cover layer (not shown) is not included in the outrigger depth.

FIG. 8 tabulates data collected from the analysis of finite element models (FEMs) of suspensions with various outrigger offsets. For each outrigger offset, roll and pitch stiffness data is tabulated in the second and third columns. This stiffness data is the effective rotational/torsional stiffnesses as seen from the slider at the gimbal, taking into account the electrical leads which wind to the slider mount area and electrically connect to the slider. The pitch stiffness of the slider can be referred to as the suspension pitch stiffness. Lateral and vertical stiffness data of the suspension is tabulated in the fourth and fifth columns. This stiffness data is the effective bending stiffnesses of the entire suspension. The cover layer of the electrical leads has little effect on stiffness and was not entered into the finite element models.

An outrigger offset of zero is the situation where the bottom of the shoulder of the bend-down tab is even with the top of the outrigger (i.e., zero distance between lines B and C in FIG. 6). As the outrigger is lowered (i.e., the outrigger offset is increased from zero), the pitch, roll, lateral, and vertical stiffnesses of the suspension change. Notably, the pitch, roll, lateral, and vertical stiffnesses change by different amounts. One can compare how differently each stiffness (i.e., pitch, roll, lateral, or vertical stiffness) changes by normalizing the data and comparing. One method of normalizing data is to compute the percentage that the data changes with respect to a value at a baseline starting point.

Figure 9:
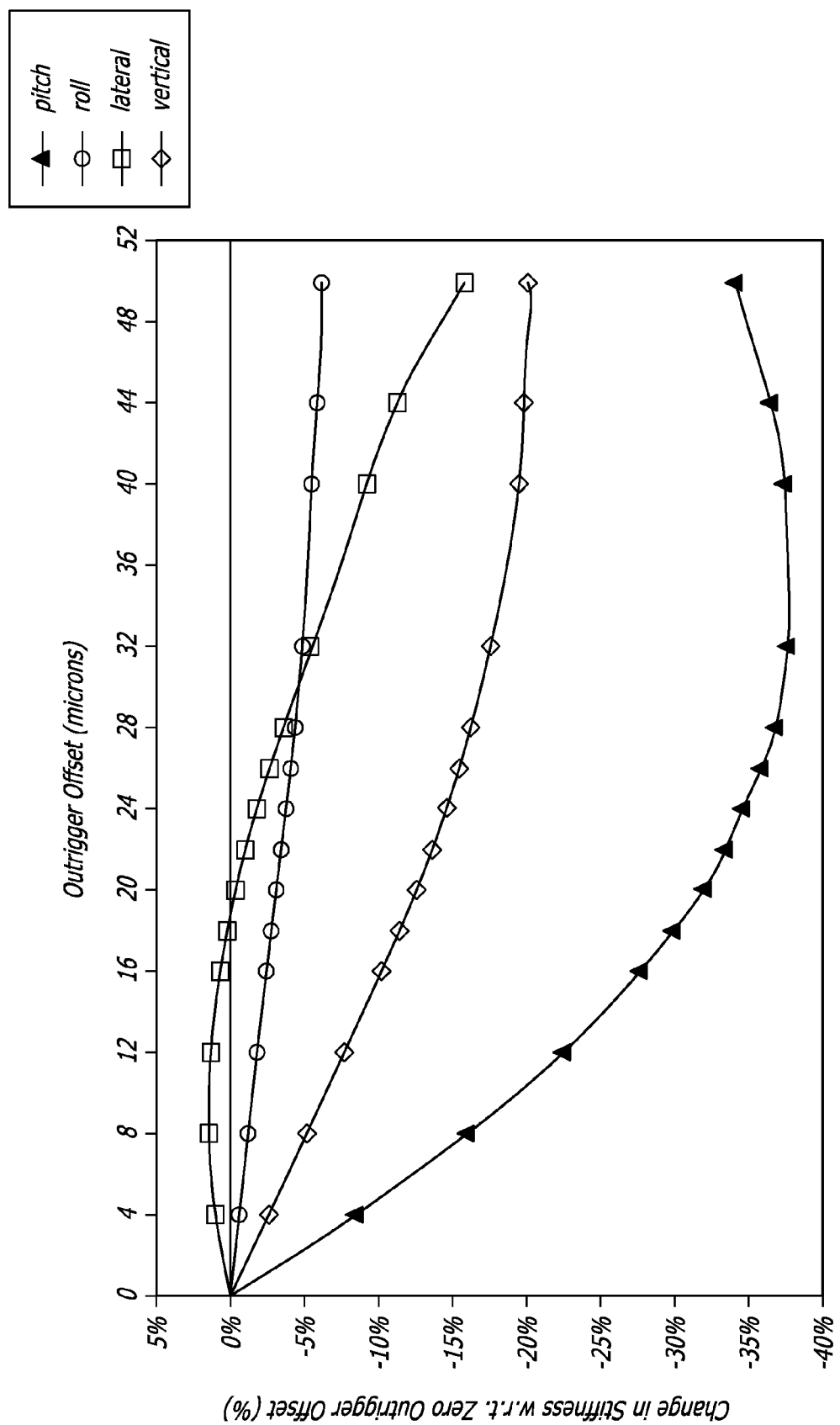
FIG. 9 is a plot of the data in FIG. 8, normalized with respect to a suspension with zero outrigger offset.

FIG. 9 plots the percentage change in stiffness for each data point in FIG. 8 with respect to (w.r.t.) a suspension with no outrigger offset. Of course, there is no change at a zero outrigger offset. Interestingly, pitch stiffness changes more than other stiffnesses. Furthermore, for outrigger offsets from 4 to 18 microns in this embodiment, lateral stiffness is slightly increased, while the other stiffnesses are decreased.

A common design objective for a suspension is to have low pitch and roll stiffnesses while having a high lateral stiffness. By employing bend-down tabs to lower its outriggers, a suspension can achieve lower pitch and roll stiffnesses while increasing lateral stiffness. By lowering the outriggers even more with deeper tab depths, a suspension can further lower pitch and roll stiffnesses.

It will be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A disk drive suspension comprising:
    a body;
    an outrigger lead comprising an electrical interconnect that is electrically connected to a read/write head at a distal portion of the outrigger lead; and
    means for supporting the outrigger lead laterally beyond the body and vertically offset from the body such that:
        the outrigger lead bows from a first vertical height at a proximal end of the outrigger lead, to a second vertical height at said supporting means, and back in a direction of the first vertical height at said outrigger lead distal end where said outrigger lead is electrically connected to the read/write head; and
    the offset reduces suspension pitch stiffness contributed by the outrigger lead.

2. The suspension of claim 1 wherein the offset is between 4 to 18 microns.

3. The suspension of claim 1 wherein the offset is at least 32 microns.

4. A disk drive suspension comprising:
    a body having a slider mounting side on which a slider is mounted;
    a tab supported by the body, the tab having a permanent vertical bend therein; and
    an outrigger lead comprising an electrical interconnect that is electrically connected to the slider;
    wherein the tab has a leg extending away from the slider mounting side and a foot extending laterally from the leg, the foot supporting the outrigger lead at a position that is vertically offset from where the tab meets the slider mounting side.

5. The suspension of claim 4 wherein a bend depth of the tab is at least a depth of the outrigger lead at the tab.

6. The suspension of claim 5 wherein the bend depth of the tab is at least 20 microns.

7. The suspension of claim 4 wherein a width of the tab is less than a width of the outrigger lead at the tab.

8. The suspension of claim 4 further comprising a second tab which is laterally opposite the first tab.

9. The suspension of claim 4 further comprising an inrigger which supports the tab and is supported by the body.

10. The suspension of claim 9 wherein the tab and inrigger are integrally formed.

11. The suspension of claim 10 wherein the inrigger comprises a gimbal spring arm and the outrigger comprises a portion of a flexure.

12. A hard disk drive comprising the suspension of claim 4, and further comprising a data storage disk, the suspension supporting the slider in close proximity to the disk.

13. A disk drive suspension comprising:
 a load beam;
 a gimbal spring arm;
 a tab having a permanent bend therein; and
 an electrical lead electrically connected to a slider;
 wherein:
  the load beam supports the gimbal spring arm;
  the suspension has a slider mounting side;
  the bent tab is connected to the gimbal spring arm, extends outwardly and laterally from the gimbal spring arm and away from the slider mounting side, and supports the electrical lead at a position that is vertically offset from where the tab meets the gimbal spring arm.

14. The suspension of claim 13 wherein a bend depth of the tab is at least a depth of the electrical lead at the tab.

15. The suspension of claim 14 wherein the bend depth of the tab is at least 20 microns.

16. The suspension of claim 13 wherein a width of the tab is less than a width of the electrical lead at the tab.

17. The suspension of claim 13 further comprising a second bent tab which is laterally opposite the first tab.

18. The suspension of claim 13 further comprising a flexure which supports the electrical lead.

19. The suspension of claim 18 wherein the tab and gimbal spring arm are integrally formed.

20. A hard disk drive comprising the suspension of claim 13, and further comprising a slider and a data storage disk, the suspension supporting the slider in close proximity to the disk.

* * * * *